United States Patent [19]

Meis et al.

[11] Patent Number: 4,693,425
[45] Date of Patent: Sep. 15, 1987

[54] DRIVE FOR MOVABLE IRRIGATION SYSTEM AND THE LIKE

[75] Inventors: Charles H. Meis, Albion; Duane B. Overvaag, Columbus, both of Nebr.

[73] Assignee: Lindsay Manufacturing Co., Lindsay, Nebr.

[21] Appl. No.: 864,331

[22] Filed: May 19, 1986

Related U.S. Application Data

[60] Division of Ser. No. 626,546, Jun. 29, 1984, Pat. No. 4,618,102, which is a continuation-in-part of Ser. No. 588,376, Mar. 12, 1984, abandoned.

[51] Int. Cl.[4] .......................... A01G 25/09; B05B 3/18
[52] U.S. Cl. ..................................... 239/735; 74/391; 74/740
[58] Field of Search ................................ 239/719–721, 239/177.1, 177.2, 178, 735, 744; 137/343, 344, 899; 180/65.6, 65.7, 65.5, 10, 242; 301/124 H, 124 R, 125; 74/391, 740; 188/173; 74/740; 192/2

[56] References Cited

U.S. PATENT DOCUMENTS

| | | | |
|---|---|---|---|
| 2,480,291 | 8/1949 | Gerentes | 188/171 |
| 2,813,604 | 11/1957 | Koepnick et al. | 192/2 |
| 3,025,938 | 3/1962 | Silberger | 188/171 X |
| 3,221,845 | 12/1965 | Hansen | 188/171 |
| 3,662,776 | 5/1972 | Bryant et al. | 239/721 |
| 3,771,719 | 11/1973 | Raso et al. | 239/177.1 |
| 3,897,843 | 8/1975 | Hapeman et al. | 180/65.5 |
| 3,952,768 | 4/1976 | Townsend | 239/177.1 |
| 4,068,679 | 1/1978 | Pringle et al. | 239/177.1 |
| 4,121,612 | 10/1978 | Conrad | 239/177.1 |
| 4,133,344 | 1/1979 | Hunter et al. | 239/177.1 |
| 4,402,374 | 9/1983 | Knur et al. | 180/65.7 |

OTHER PUBLICATIONS

U.S. Electrical Motors, Bulletin, "Wheel Drive, Reliable Power for Center Pivot Irrigation", 2/77.

*Primary Examiner*—Andres Kashnikow
*Assistant Examiner*—MaryBeth O. Jones
*Attorney, Agent, or Firm*—Kinzer, Plyer, Dorn, McEachran & Jambor

[57] ABSTRACT

This is concerned with a drive for a movable irrigation system and the like and is more specifically concerned with a gear drive arrangement between an electric drive motor and one or more of the wheels of a tower of a movable irrigation system with two gear assemblies between the electric motor and the ground engaging wheel, one of the gear assemblies being constructed and arranged for maximum speed reduction and minimum torque capacity and the other being driven by the first and constructed and arranged for minimum speed reduction and maximum torque capacity and driving the output shaft to the ground engaging wheel.

6 Claims, 9 Drawing Figures

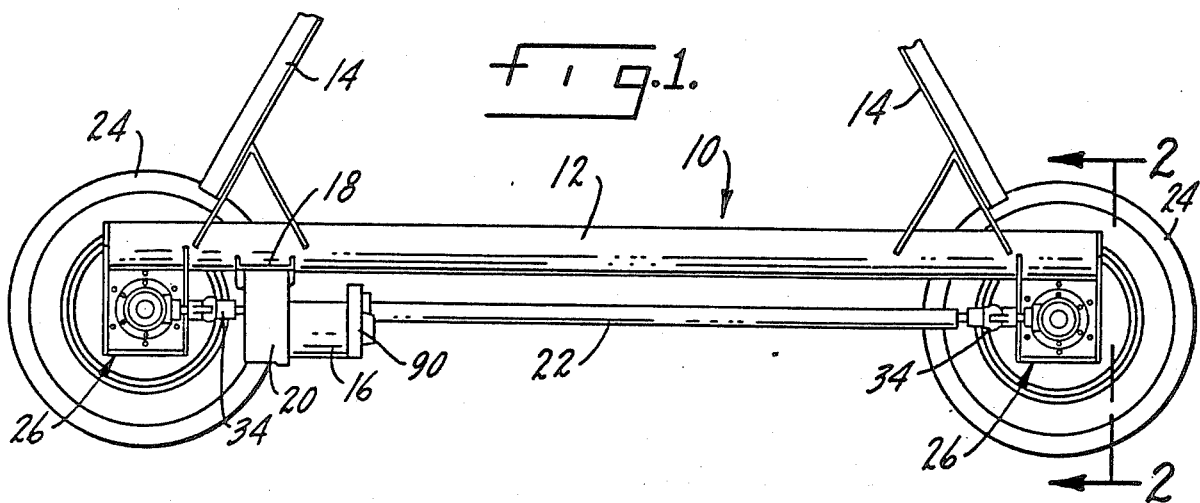
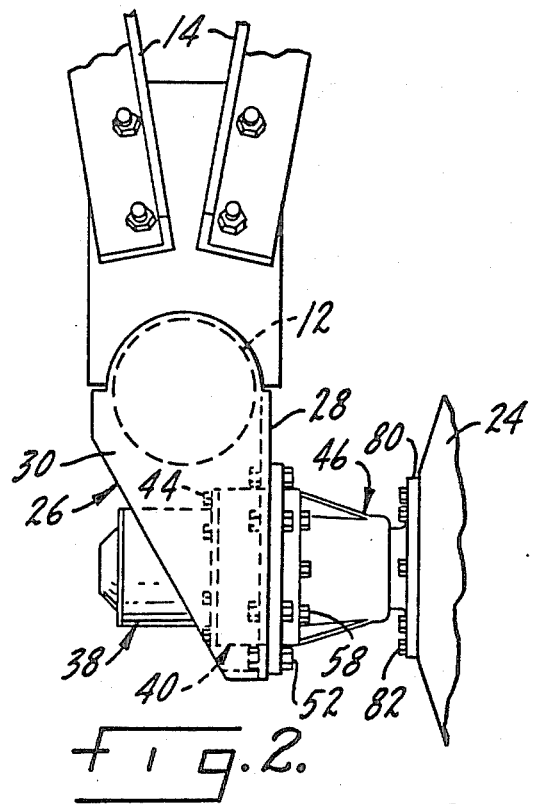
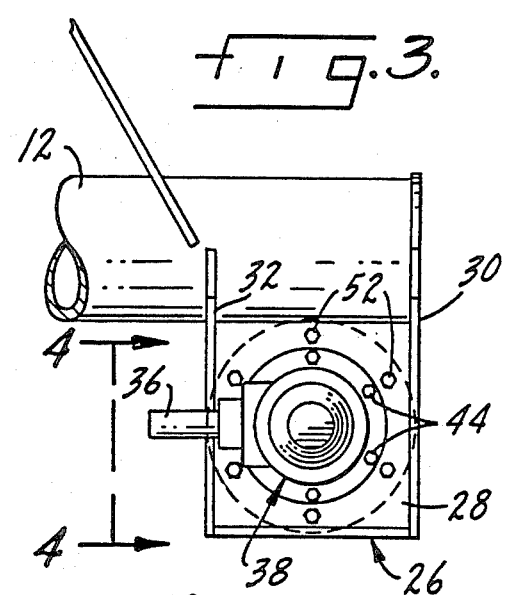
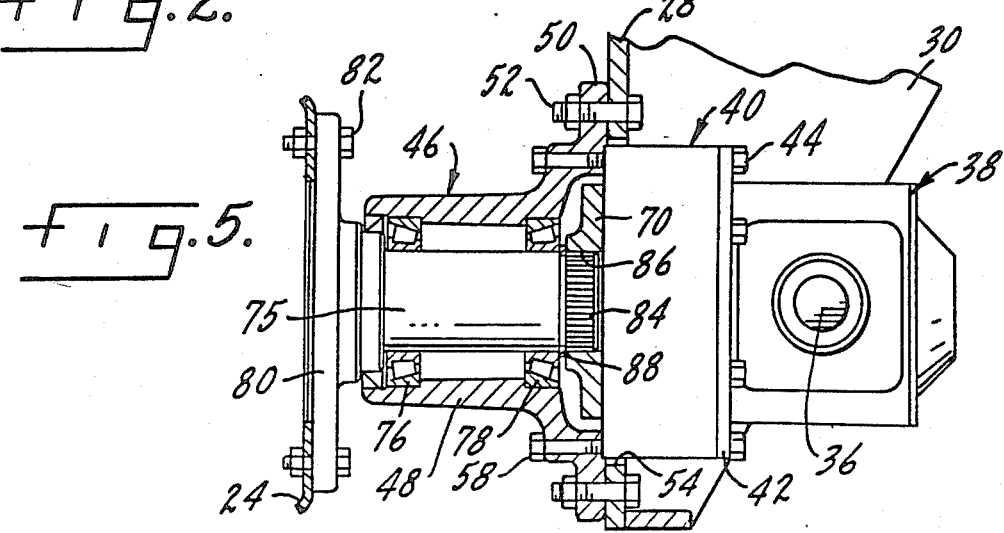

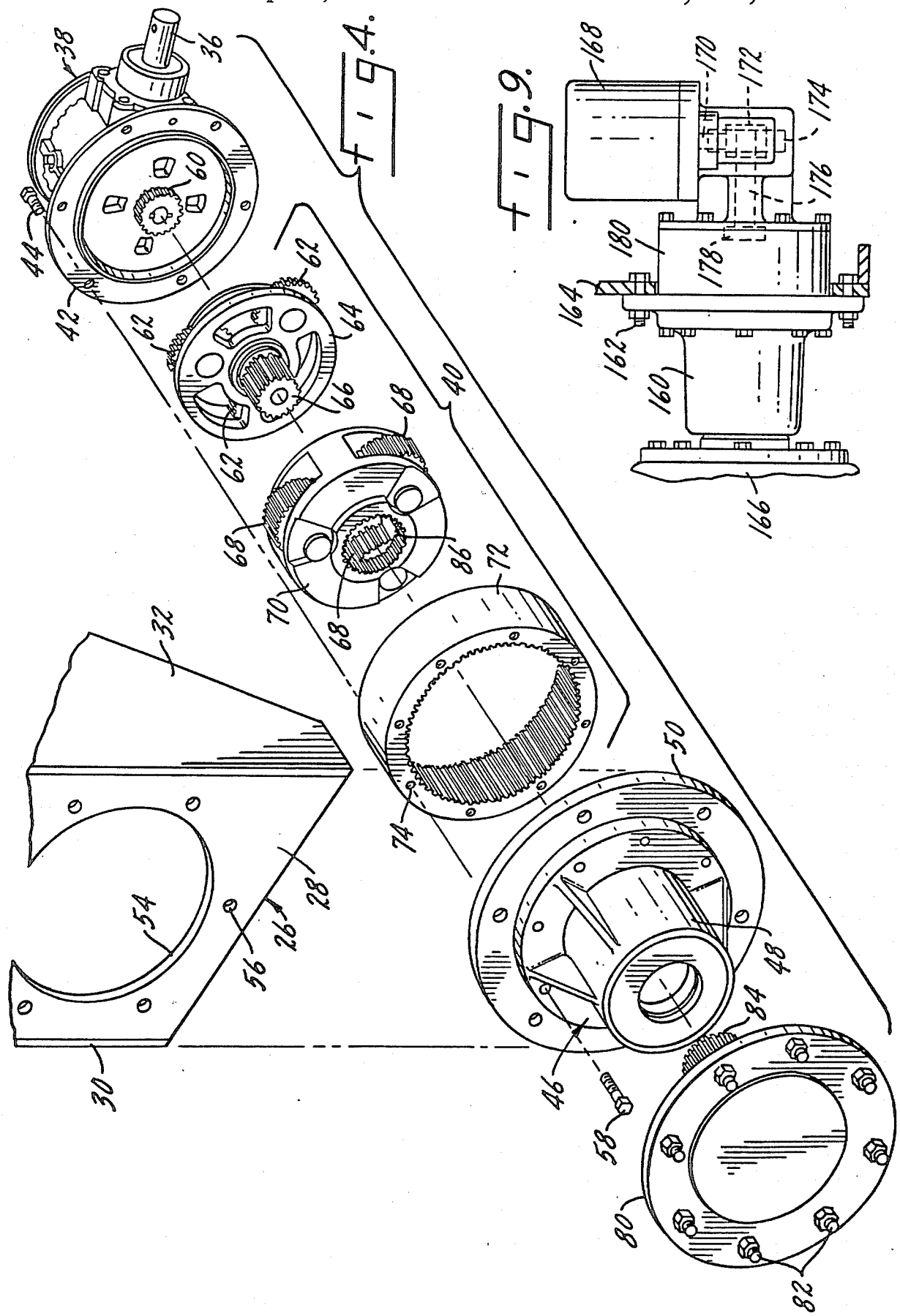

4,693,425

DRIVE FOR MOVABLE IRRIGATION SYSTEM AND THE LIKE

This is a division of application Ser. No. 626,546 filed June 29, 1984, now U.S. Pat. No. 4,618,102 issued Oct. 21, 1986 which was a continuation-in-part of application Ser. No. 588,376 filed Mar. 12, 1984, now abandoned.

SUMMARY OF THE INVENTION

This invention is concerned with a movable irrigation system, for example a center pivot system or a lateral move system and is more specifically concerned with the drive for such a unit although, it is not limited thereto.

A primary object of the invention is a gear drive arrangement for a movable irrigation system in which a planetary gear arrangement is used which greatly reduces cost.

Another object is a drive arrangement of the above type which increases energy efficiency by a significnt amount.

Another object is a more energy efficient drive assembly for movable irrigation systems.

Another object is a gear drive arrangement of the above type which lets much smaller electric motors be used.

Another object is a drive arrangement for such a system which requires less power or energy to drive it.

Another object is an improved gear drive arrangement for a movable irrigation system either of the center pivot or lateral move type.

Another object is a gear arrangement for a movable irrigation system which does not require a disconnect between the wheels and gears when the wheels are turned 90° for towing.

Another object is a spring loaded brake arrangement in a motor on a movable irrigation system which prevents the unit from rolling on its own, for example, downhill when the gear drive is not self-locking.

Another object is a gear box arrangement for a movable irrigation system which is in two gear assemblies, the first being constructed and arranged for maximum speed reduction and minimum torque increase while the second is the reverse.

Another object is a gear box arrangement for a center pivot irrigation system or the like which has two assemblies, the first being a spur gear assembly and the second being a planetary gear assembly.

Another object is a gear box arrangement for a movable irrigation system which is very compact and allows for a small electric motor, meaning low in horsepower.

Another object is a two phase gear box arrangement which facilitates the use of individual drive motors on each wheel.

Another object is a combination gear assembly which provides a smallest package.

Another object is a combination gear box of the above type in which, in the first assembly, there is a speed reduction on the order of 80:1, and in the second assembly, there is a speed reduction on the order of 25:1.

Other objects will appear from time to time in the ensuing specification and drawings.

BRIEF DESCRIPTION OF THE DRAWINGS

FIG. 1 is a side view of the lower part of a tower for a movable irrigation system.

FIG. 2 is a view taken along line 2—2 of FIG. 1 on an enlarged scale.

FIG. 3 is an enlarged view of the gear and right end of the tower in FIG. 1.

FIG. 4 is a exploded perspective as viewed along 4—4 of FIG. 3.

FIG. 5 is a side view of a portion of the wheel and the gear box with parts in section.

FIG. 9 is a side view, similar to FIGS. 5 and 6, of a further variant.

BRIEF DESCRIPTION OF THE PREFERRED EMBODIMENT

Figure 6:
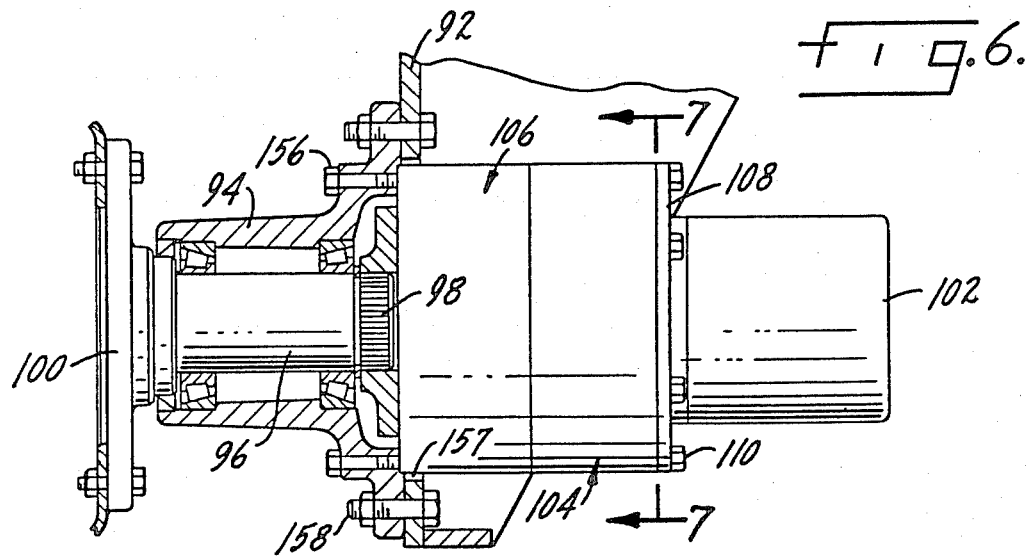
FIG. 6 is a side view, similar to FIG. 5, of a variant form showing a portion of the wheel and gear box with parts in section.

In FIG. 1 the lower part of what may be considered the tower on a movable irrigation system of the type shown more or less in U.S. Pat. No. 3,954,120 issued May 4, 1976 and assigned to the present assignee is shown. The top of the tower may be conventional and has not been shown which is also true of the movable pipeline and related structure. The tower is generally designated by numeral 10 which includes a main frame in the form of a tube or pipe 12 attached to upstanding inclined braces 14 welded thereto and rising upwardly to the water distribution pipe. A power source 16 in the form of an electric gear motor is connected to the frame 12, shown in this case by a bracket 18 which may be welded or otherwise suitably connected to the tube or pipe 12. A gear box 20, for the gear motor, operates a drive shaft 22 which extends in opposite directions more or less parallel to the frame tube 12 so as to drive a tire or wheel 24 on each end of the tower. The gear arrangement in box 20 is constructed and arranged for maximum speed reduction and minimum torque capacity, for example, a speed reduction of something on the order of 40:1. A mounting box or bracket 26 is welded or otherwise suitably secured at each end of the structural tube and includes a lateral wall 28 and two end walls 30 and 32 at each end which depend from tube 12, so that, in effect, a structural box is provided for mounting the wheel.

Drive shaft 22 is connected through a universal joint 34 to an input shaft 36 which extends into a gear box assembly 38 which has two bevel gears to turn the drive at right angles into a planetary gear box assembly 40. Gear box 38 has a flange or cover 42 which abuts and is bolted at 44 to the planetary gear drive.

A cover assembly 46 for the planetary gear box 40 has an extended hub 48 with a flange 50 at one end which is bolted at 52 to the lateral wall 28 of the structural box or housing 26. It will be noted that the assembly fits in an opening 54 in the wall 28 of the structural box 26 with the flange 50 being bolted to the bolt holes 56 shown in FIG. 4. The cover assembly is mounted on the other side of the structural box 26 with the hub 48 extending away therefrom as a mounting for the wheel, as explained hereinafter. The planetary gear arrangement 40 is constructed and arranged for maximum torque capability and is positioned in the opening 54 in the structural box and is connected thereto by bolts 58 which are on a smaller diameter or bolt circle than the bolt holes 56. The bolts 58 do not connect to the structural box 26 but rather connect the planetary gear assembly and gear drive to the cover assembly 46. It will be noted in FIG. 5 that the planetary gear assembly 40 fits within the opening 54 in the structural box.

The right angle gear box 38 has an output sun gear 60 in FIG. 4 which meshes with the planetary gears 62 in the first stage planetary gear set up 64. The sun gear 66 from the first planetary stage fits in and drives the planetary gears 68 on the second stage planetary unit or assembly 70. While shown an an exploded perspective in FIG. 4, the first and second planetary stages 64 and 70 intermesh and fit within a ring gear 72 the interior of which meshes with planetary gears 62 and 68 in the two planetary stages. The exterior of the ring gear 72 also serves as the outer housing of the planetary gear assembly as shown in FIG. 5.

The bolts 58 on the smaller bolt circle in FIG. 5 extend through the flange of the cover assembly and thread into openings 74 in the face of the ring gear 72, as shown in FIG. 4. Bolts 44 which mount the right angle gear box assembly 38 on the ring gear 72 fit in similar threaded openings on the other side of the ring gear.

There is an output shaft 75 supported by spaced bearings 76 and 78 in the hub with an enlarged flange 80 on the outer end thereof to which the wheel may be mounted by bolts 82 or the like. The inner end of the output shaft 75 is splined at 84 so that it meshes with the interior 86 of the second planetary stage 70. The output shaft 75 is held against the inner bearing 78 by a snap ring 88.

Since the gear train is not self-locking such as a worm gear would be, the tower may have a tendency to roll ahead under gravity, for example, on a downhill slope. It is therefore believed advisable to include a braking system which may take the form of an electrically operated spring loaded brake 90 in FIG. 1, on the end of gear motor 16 connected and arranged so that the brake will release when current is on and the motor 16 is operating but will be spring loaded to close and lock or brake the system when current is turned off and the unit is not being driven.

Figure 7:
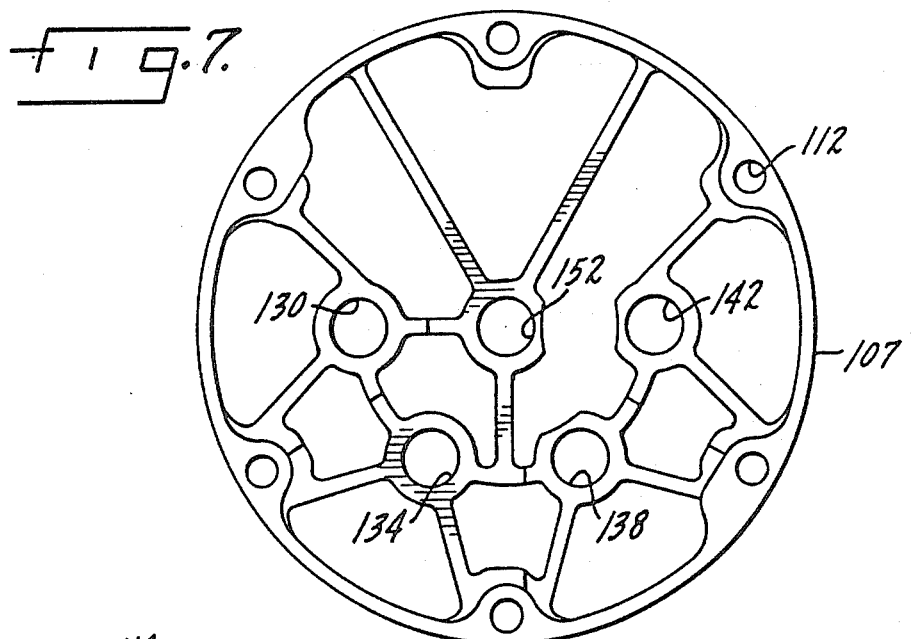
FIG. 7 is a section along line 7—7 of FIG. 6 on an enlarged scale.
Figure 8:
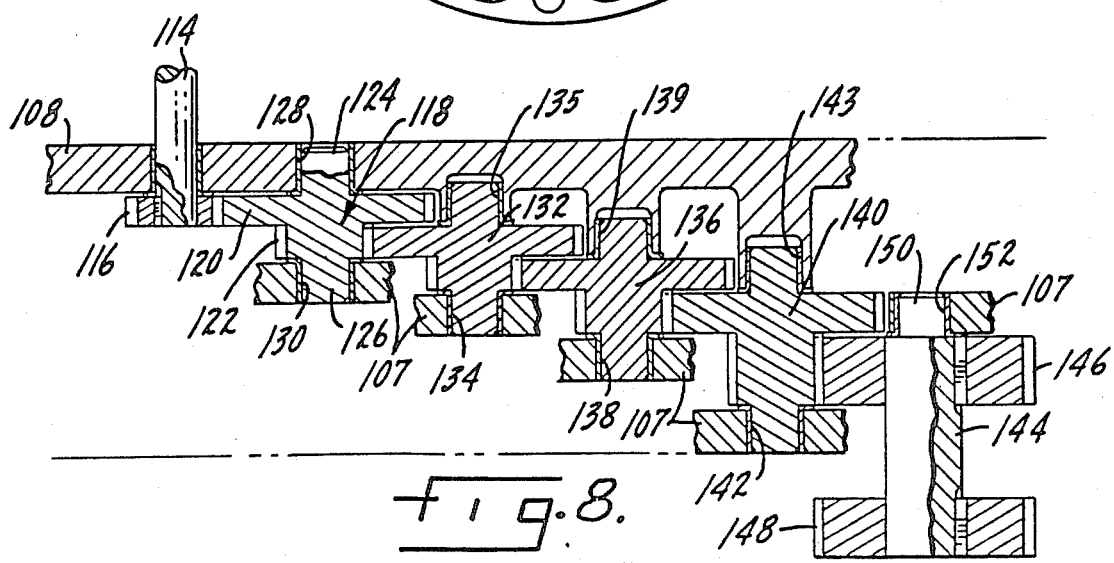
FIG. 8 is a developed view in section of this gear train of FIG. 7.

A variant form shown in FIGS. 6 through 8 and is similar in many respects to the previous form in that the structured box 92 at the end of the tower is connected to a hub 94 which supports an output shaft 96 which is splined on the inner end at 98 with a flange 100 on the outer end for a wheel.

Instead of a single motor and gear box between the wheels with a drive shaft running out to each, such as shown in FIG. 1, each wheel has its own drive motor 102 in FIG. 6 with an input shaft on the inner end thereof extending into and driving a first gear assembly or box 104 which in turn may drive a second gear assembly or box 106 which in turn drives the output shaft 96.

The first gear box 104 will be explained in connection with FIGS. 7 and 8 and it should be understood that it is specifically constructed and arranged for maximum speed reduction without much torque capacity, whereas the second box 106, which may be the same as the planetary arrangement, designated 40 in FIG. 5 and shown in detail in FIG. 4, is constructed and arranged for maximum torque capacity and minimum speed reduction. This is to say that most of the speed reduction is accomplished in the first box and most of the torque capacity in the second box. The first box 104 in FIG. 6 may under certain circumstances be considered as a substitute or alternate to the gear box 20 in FIG. 1 and has the specific advantage that individual drive motors may be mounted on each wheel whereas a single drive motor 16 in FIG. 1 is mounted between the wheels.

The first gear box or assembly 104 has a generally cylindrical housing 107 with a cover plate 108 mounted thereon by bolts 110 or the like which fit through suitable openings 112 and thread into the housing of the second gear assembly 106. The interior of housing 107 has a plurality of a webs or ribs which interconnect and establish or support a plurality of sockets or bearings which position and support a plurality of intermediate spur gear sets, shown in this case as four. FIG. 8 is a section taken through the various bearings or sockets, on a constant radius about the center and thereafter, laid out so that the input, the intermediates, and the output gears appear to be in the same plane. FIG. 7 is a section taken along line 7—7 on FIG. 6, with the various intermediate gears removed. Drive motor 102 has an output shaft, shown at 114 in FIG. 8, which extends through cover 108 and becomes an input shaft for the first gear assembly or box 104. The input shaft 114 is aligned with the center of housing 107 and is supported by the cover 108. The inner end of input shaft 114 has a small gear 116 which meshes with and drives the first intermediate 118. The first intermediate 118, as well as the other intermediates to be explained hereinafter, each have a large gear 120 and small gear 122, the large gear being driven by the small input gear 116. The first intermediate has trunnions 124 and 126 on each end, the outer trunnion 124 being mounted in a bearing or socket 128 in cover plate 108. The inner trunnion 126 is mounted in a bearing or socket 130 which is positioned and supported by the webs in the housing 104. The bearing or socket 130 is shown to the left of the center line of the housing in FIG. 7. The next intermediate 132 has its inner bearing or trunnion supported by the second socket 134 in the housing and a bearing or socket 135 formed on cover plate 108. The third intermediate 136 has its inner trunnion supported by a third bearing or socket 138 in the housing and its outer trunnion by a socket 139 formed on the cover plate. The fourth intermediate 140 has its inner trunnion supported by the fourth bearing or socket 142 in the housing 104 and its outer trunnion by a socket or bearing 143 formed on the cover plate 108. These bearings or sockets in FIG. 7 proceed counterclockwise with the center line of each being on a constant radius swung about the center line of the housing. As the drive from the input shaft 114 proceeds from one intermediate to the next, the large gear on each intermediate is driven and the small gear is the driver. The last intermediate 140 drives an output shaft 144 which has an inner gear 146 which meshes with the small gear on the last intermediate 140 and an output gear 148 on the outer end thereof which serves as the input for the second gear assembly 106 in FIG. 6. The output shaft 144 has a trunnion 150 on its inner end which fits in and is supported by a socket or bearing 152 in the middle of the housing 104.

Assuming that the second gear assembly 106 is the same as the planetary drive shown in FIG. 4, then the output gear 148 in FIG. 8 would be the same as or take the place of sun gear 60 in FIG. 4 and would drive the planet gears 62 in the first planetary stage 64. So the planetary gears would support the outer end of output shaft 144, which is to say that output gear 148 will float in the planet gears 62. Thereafter, the drive to the output shaft 96 in FIG. 6 and the wheel hub 100 could be same. It will be noted in FIG. 6 that the entire gear assembly, both boxes or assemblies 104 and 106, are mounted at 156 on the flange of hub 94 and positioned in an opening 157 in the frame box 92 so that both gear assemblies as well as the drive motor 102 may be removed for repair and service without disturbing the mounting 158 between hub 94 and the box 92 of the tower. The result is that the drive and gearing 102, 104 and 106 may be removed without having to jack up or otherwise take the load off of the wheels of the tower. This may be the same as stated previously in connection with FIGS. 1–5.

Whereas four intermediates have been shown in FIG. 8 between the input and output shafts for the first gear assembly, it should be understood that more or less may be used depending upon what exact speed reduction and torque increase is desired. One of the advantages of the arrangement shown in FIGS. 7 and 8 is that a very high gear ratio reduction, for example, on the order of 80:1, can be acquired in a very small space. The various intermediates are all stacked together on a helical circle or path. The first gear box or assembly has the advantage that it provides a substantial speed reduction with little torque capacity while in the second stage, substantial torque capacity takes place without as great a speed reduction. As examples of the above, the first stage 104 may have a speed reduction on the order of 80:1, whereas, the second stage might have a speed reduction of 25:1, with the combination giving an overall speed reduction from the drive motor to the wheel of something like 2000:1, all in a very small volume or space. The combined overall length of the gear mechanism might be something like 7 inches with a 2000:1 speed reduction being driven by, for example, a ⅛ horse power motor.

It will be noted in FIG. 1 that the brake on the electric motor to prevent the unit from rolling downhill when the power is off, is on the end of the motor 16, not down the gear train someplace. The advantage of this is that the shaft of the motor will be at the highest speed and lowest torque which is where the least expensive braking can be obtained.

Whereas, the arrangement has only been shown with wheels that generally are on an axis parallel to the pipeline, quite frequently it is desireable to tow units of this type from one field to another. And when that is to occur the wheels must be indexed 90°. In the form shown in FIG. 1 this is done by disconnecting the universal joints 34 and then indexing the depending bracket or box on each end of the frame some 90° so that the wheels are then lined up with the pipeline. In FIG. 4, the particular brackets 26 are not constructed for indexing. But any suitable and well known index arrangement might be used, for example that shown in U.S. Pat. No. 3,730,435 issued May 1, 1973. With the wheels thus indexed, the unit can then be towed from one location to another without disconnecting each of the wheels from its planetary gearing because the resistance offered by the planetary gearing is sufficiently low that disconnecting is not necessary. This is to say that the planetary gearing is not self-locking and the resistance to towing is sufficiently low that a disconnect is not necessary.

In the form shown in FIGS. 6–8 with the additional gearing in the first gear assembly connected directly to the planetary gearing in the second gear assembly, there may be sufficient resistance such that if this arrangement is used in a towable unit with the wheels on each end of the tower indexable, it may be desirable and/or necessary to disconnect the wheel from the gear train. And this could be done, if desired, by a suitable disconnect, such as shown in U.S. Pat. No. 3,730,435.

Whereas the second the gear box or assembly has been shown and described as a planetary gear arrangement, it should be understood that for certain applications a different gear drive might be used for the second phase. For example, under certain circumstances an epicyclic drive might be used of the type presently manufactured and sold by Esco Manufacturing Inc., Chagrin Falls, Ohio under the designation CYKLIC In-Line Epicyclic Speed Reducer, currently available from Kiss Corporation, Chagrin Falls, Ohio 44022.

Also, a worm wheel and worm gear device, such as shown in U.S. Pat. No. 3,954,120, issued May 4, 1976, may be used for the first box or assembling driving the planetary second assembly which would have advantages in certain situations. In addition such a combination could have individual motors, such as in FIG. 6, or a center motor with a drive shaft to each way, as in FIG. 1.

For example, in FIG. 9 the hub 160, its mounting 162 on the frame or tower 164, the wheel mounting 166, etc. may be the same as before. An individual drive motor 168 is shown as driving an output shaft 170 with a worm gear 172 on the lower end thereof to drive a worm wheel 174 on an output shaft 176 with a first stage sun gear 178 on the outer end thereof which may be the same as the first stage sun gear 60 in FIG. 4, for example. In a sense, the worm gears 172 and wheel 174 is the first gear assembly and the second 180 may be the same as the planetary arrangement shown in FIG. 4. If desired, the electric motor 168 may be of the size sufficient to drive both wheels on a tower in which event the output shaft 170 could be horizontal and would have a worm and worm gear at the other end to drive a second gear assembly, which might be planetary, on the other wheel. Or each wheel might have its own motor. This alternate type of arrangement is of the general character as that commonly known as the wheel drive as compared to the one known as the center drive, which are shown and discussed generally in a bulletin entitled "Wheel Drive, Reliable Power for Center Pivot Irrigation", Bulletin No. BR409-30A (2/77) 20M put out by U.S. Electric Motors, division of Emerson Electric Co., 125 Old Gate Lane, Milford, Conn. 06460. None of the details have been included here.

But the point is that the first gear assembly may be a conventional worm gear and worm wheel arrangement with the electric motor disposed vertically such as at 168 in FIG. 9 with each wheel having its own motor or it may be disposed horizontally with a common shaft running to the other wheel, each wheel having its own second gear assembly which may be a planetary arrangement mounted in the particular manner shown and described herein.

In such an arrangement there would be sufficient resistance by the worm wheel and worm gear so that an anti-roll downhill electric brake, such as referred to at 90 in FIG. 1, might not be necessary.

The use, operation and function of the invention are as follows:

The planetary drive may be driven by an electric motor through a gear box as shown in FIGS. 1 and 6 or the drive may be hydraulic. The details thereof are unimportant. The wheel is mounted on one side of the tower and the structure is supported by the extended hub which is structurally connected to the box or bracket 26 and 92. Thus, none of the load or weight of the tower goes through the gear drive. This is particularly important in connection with a planetary drive because of the complexity and possibilities for malfunction thereof.

It will be noted in FIG. 5 that the power drive from the electric motor gear box 16, 20 to the planetary gears are separate and independent from the load or weight of the tower. The same is true of FIG. 6. This is to say that the weight of the tower and pipeline passes through the structural box to the hub and wheel without passing through or affecting any part of the gearing arrangement.

The planetary assembly is mounted within the opening in the structural box 26, 92 and is connected by bolts 58, 156 to the inner part of hub flange. Any misalignment will be taken up by the spline 84, 98 which is at the output end of the planetary gears and none of the structural load will affect this. While two planetary stages have been shown, it shall be understood that it may be more or less although the arrangement shown and described is considered particularly advantageous.

In the event that the gear drive needs service, either or both may be removed by backing out bolts 44, 110 and/or bolts 58, 156, so that the gear assembly can be removed without disturbing or interfering with or affecting the structural connection between the tower and wheel. Thus, the tower does not have to be jacked up and the load taken off of the wheels before the drive assembly can be removed and serviced.

The result is that smaller electric motors, at 16, 102 may be used which results in substantial savings in energy requirements. This is to say that the energy to drive the tower is substantially reduced.

In a particular arrangement in the past, the drive motors have had to be one horse power each whereas by using the present arrangement, they may be reduced to $\frac{1}{4}$ horse power motors in the case of FIG. 1 and $\frac{1}{8}$ horse each in the case of FIG. 6. The present gear drive generates more torque per unit of energy which is to say that the generator to power the overall irrigation system may be something on the order of 50% smaller. In addition, the life of the present gear box arrangement is significantly extended. Further, servicing a unit of the present type is far simpler in that the tower does not have to be jacked up to take the load off the wheels before the gear box can be removed for service.

It will also be noted that the distance between the bearings in the hub is substantially greater than the distance between the outside bearing and the vertical load plane of the ground-engaging wheel such that the overhung load applied to the bearings caused by the ground-engaging wheel being offset to one side of the frame is carried by the substantial spacing of the bearings.

The FIGS. 6-8 arrangement has the advantage that each wheel has its own motor and the combination of the two aligned gear boxes. The first gives maximum speed reduction and very little torque capacity while the second, the planetary gear drive, gives a small speed reduction and maximum torque capacity. By using two gear boxes, one constructed for maximum speed reduction and the other for maximum torque capacity, the combination and overall will provide maximum speed reduction in quite a small space which is highly desirable and very important in movable irrigation systems where the drives are mounted on the ends of movable towers.

While the preferred form and several variations have been shown and suggested, it should be understood that suitable additions, modifications, changes, substitutions and alterations may be made without departing from the invention's fundamental theme.

We claim:

1. In a movable irrigation system, an elongated water distribution pipe, a plurality of movable towers supporting the pipe at intervals, each tower having wheels providing for movement of the system, a drive assembly for at least one of the wheels including at least one electric drive motor on each tower for driving at least one of the wheels, a non-self-locking planetary gear assembly between the drive motor and the said at least one of the wheels, and an electrically operated brake on the drive motor automatically responsive to the electric current supplied to the drive motor for applying a braking force to the drive motor for braking the drive assembly when the electric motor is not energized, and a spur gear assembly between the drive motor and planetary gear assembly for maximum speed reduction and minimum torque capacity.

2. In a movable irrigation system, an elongated water distribution pipe, a plurality of movable towers supporting the pipe at spaced intervals, ground engaging wheels on each tower, at least one high speed electric motor on each tower, a drive train between the electric motor and at least one of the wheels, and a gear reduction mechanism in the drive train for reducing the speed of rotation and increasing the torque, including input and output shafts therefor, the input shaft being driven by the electric motor and the output shaft driving at least one of the ground engaging wheels, two gear assemblies, the first being constructed and arranged for maximum speed reduction and minimum torque capacity and driven by the input shaft, and the second being driven by the first and constructed and arranged for minimum speed reduction and maximum torque capacity and driving the output shaft.

3. The structure of claim 2 further characterized in that the second gear assembly is a planetary gear assembly.

4. The structure of claim 2 further characterized in that the first gear assembly is a spur gear assembly.

5. The structure of claim 2 further characterized in that the two gear assemblies are aligned and in aligned housings.

6. The structure of claim 5 further characterized in that the electric motor is aligned with the aligned gear assemblies.

* * * * *